United States Patent [19]
Benito Navazo

[11] Patent Number: 5,753,856
[45] Date of Patent: May 19, 1998

[54] JUNCTION BOX FOR RACEWAYS FOR ELECTRICAL CONDUCTORS

[75] Inventor: Juan Manuel Benito Navazo, Barcelona, Spain

[73] Assignee: Aparellaje Electrico, S.A., Barcelona, Spain

[21] Appl. No.: 673,124

[22] Filed: Jul. 1, 1996

[30]  Foreign Application Priority Data

Jul. 12, 1995 [ES] Spain ............................ 9501397

[51] Int. Cl.$^6$ ...................................... H05K 5/00
[52] U.S. Cl. ........................................... 174/50
[58] Field of Search ..................... 174/58, 49, 48, 174/50; 220/3.9; 52/220, 221

[56] References Cited

U.S. PATENT DOCUMENTS

| | | | |
|---|---|---|---|
| 4,875,871 | 10/1989 | Booty, Sr. et al. | 439/209 |
| 5,300,731 | 4/1994 | DeBaratolo, Jr. et al. | 174/48 |
| 5,486,650 | 1/1996 | Yetter | 174/53 |
| 5,629,496 | 5/1997 | Navazo | 174/48 |

FOREIGN PATENT DOCUMENTS

| | | | |
|---|---|---|---|
| 0 267 079 | 5/1988 | European Pat. Off. | 174/48 |
| 0 633 639 | 1/1995 | European Pat. Off. | |

*Primary Examiner*—Kristine L. Kincaid
*Assistant Examiner*—Joseph Waks
*Attorney, Agent, or Firm*—Staas & Halsey

[57] ABSTRACT

A junction box for raceways applicable to a surface, formed by: an integral support base member including (i) a plate member, applicable to the surface and having an edge for fitting to a raceway; (ii) two tubular body members perpendicular to the plate member adjacent apexes having upper ends; (iii) adjustable members adapted to engage another raceway; and (iv) a first member for attachment to a lid member; a cable transfer member including: a structure holding removable sheet members and having a rear wall and a front wall; and being superimposable over the length of a raceway; and a lid member which is a hollow body having side walls and an upper cover and adjacent to house the base member and the cable transfer member. The lid includes a member for attachment of said support base

11 Claims, 5 Drawing Sheets

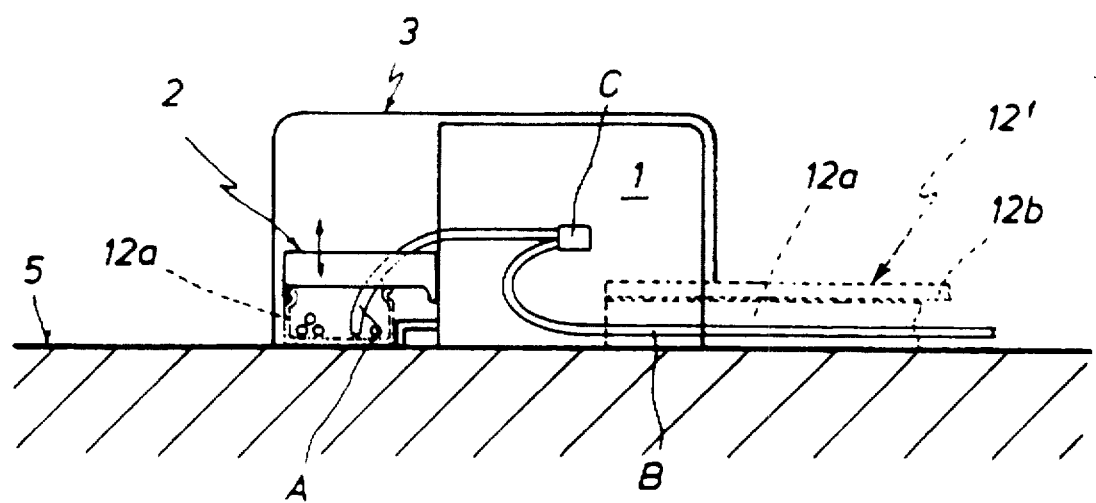
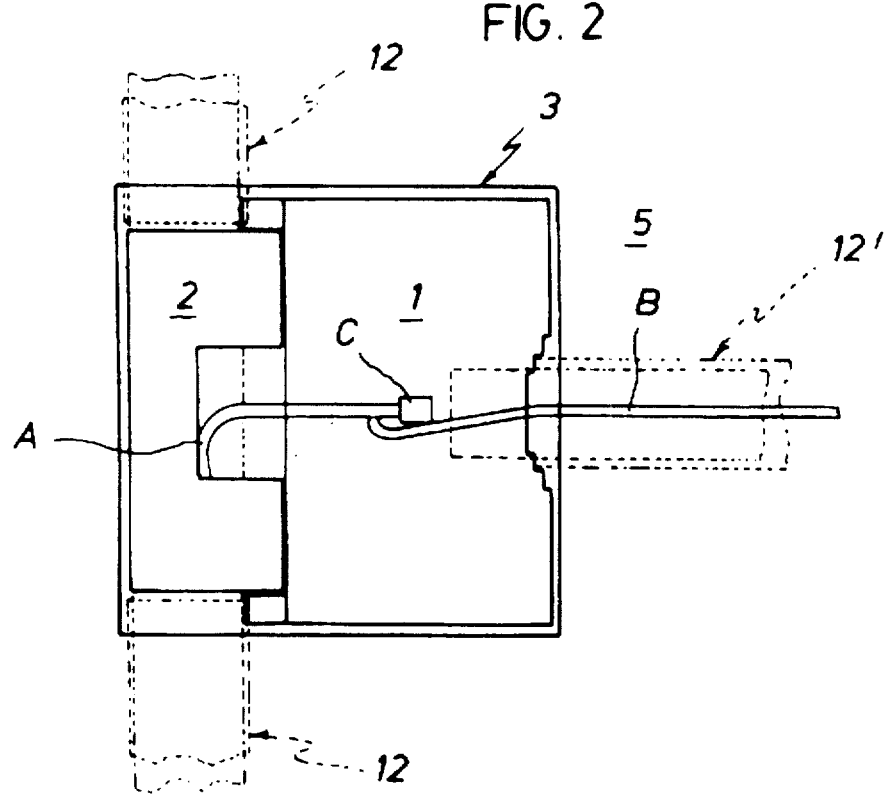

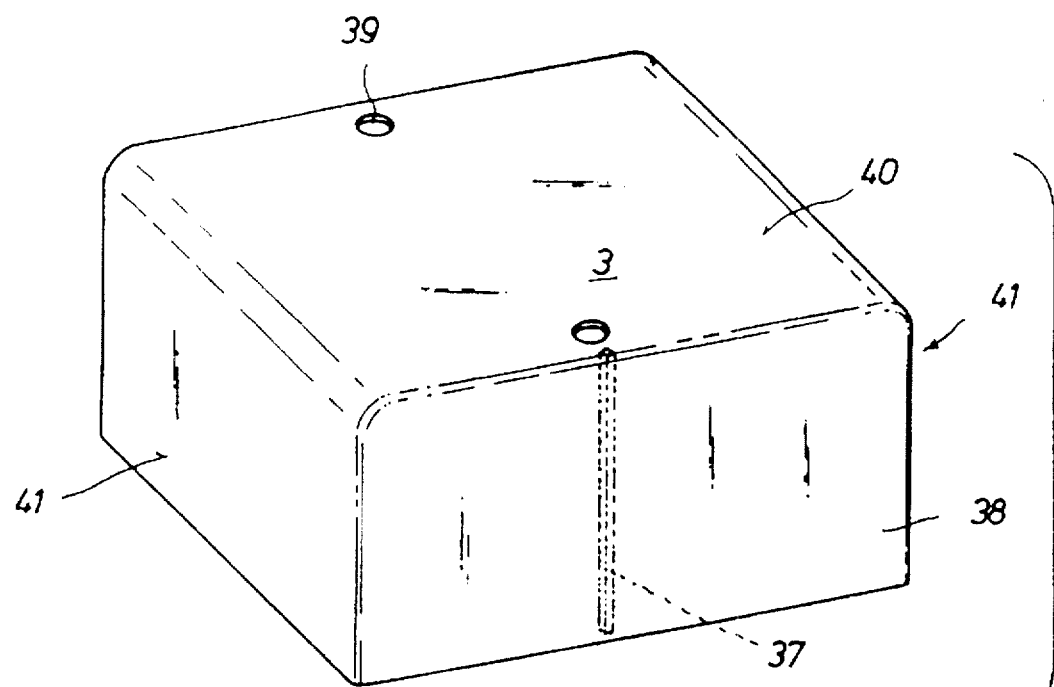
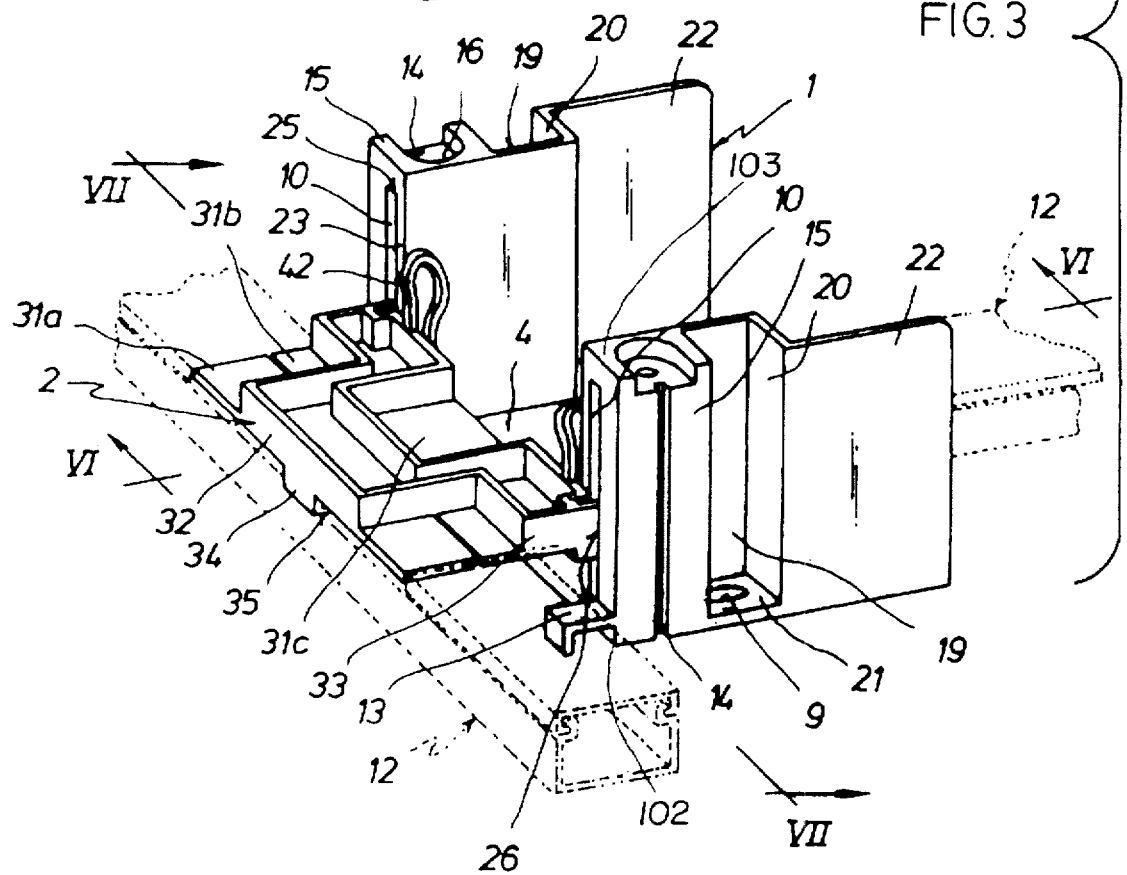
FIG. 3

5,753,856

JUNCTION BOX FOR RACEWAYS FOR ELECTRICAL CONDUCTORS

BACKGROUND OF THE INVENTION

1. Field of the Invention

The present invention relates to a junction box for raceways for electrical conductors, particularly for a pair of raceways formed by a first raceway and a second raceway, each of which is formed by a "U" shaped base section, adapted to be closed by a lid section, said raceways being applicable to a substrate surface.

2. Reference to the Prior Art

It frequently happens, in practice, that an installation of such raceways has to be extended, requiring the establishment of taps of the installed electrical conductors to form an auxiliary line in which the electrical conductors thereof have to be electrically connected to those of the main line, at the same time as the respective raceways have to be mechanically coupled to achieve continuity of the electrical and mechanical protection of the electrical conductors and of their connections.

In these cases, the tap and the inherent electrical connection have to be made with random means, the electrical connection being disposed in one or the other of the raceways, by opening one of the walls of the base section thereof and making the mechanical connection by simply abutting one end of the second raceway at rightangles to the first raceway, which involves spatial difficulties for making and locating the electrical connection and the break in continuity of the insulated precinct formed by the raceways, caused by the said side opening and the simple abutment of the side wall thereof with the end of the incident raceway.

To overcome this situation, accessories have been devised which allow more space to be created for the electrical connection and/or maintaining the continuity of the insulated precinct, such as quadrangular or "T"-shaped branch boxes, junction boxes, etc. it being necessary in all cases to form an opening in the corresponding wall of the raceway base section, or in both walls and the bottom in the case of "T" branches. Furthermore, the assembly of such boxes in an existing raceway installation, to form a branched line, makes it necessary to cut away a portion of the raceways to make space for the location of the box, which involves lifting the affected part of the installation.

As one embodiment of the foregoing solutions, applied to the connection of an electrical mechanism, there may be mentioned a device wherein there is observed the need to form an opening in the side wall of the raceway. Nevertheless, the majority of such devices are hard to mount in the installations, require a multiplicity of parts and the passage points of the electrical conductors from the raceway to the connection device are insufficiently insulated with regard to the surface on which they are mounted.

SUMMARY OF THE INVENTION

To overcome such drawbacks, with specific application to the installation of electrical mechanisms, the present applicant devised the adapter of an electrical mechanism to a raceway described in EP-A-0 633 639, which comprises a support base member carrying the electrical mechanism, a housing for the support base member, a closing and covering arrangement which couples to the housing and the raceway, transversely to the latter, and optionally a guide member applied to the raceway in the coupling zone thereof by the closing and covering arrangement. This device does not require interrupting the raceway or making any side opening therein, comprises a small number of parts which are easy to use and ensures insulation of the adaptation, branch or connection with regard to the surface on which it is mounted.

Thus, an arrangement suitable for installations of the said raceways, allowing connections to be made between the electrical conductors thereof, maintaining the insulation and being adaptable to a wide range of width and height dimensions of the raceways, would be desirable.

In accordance with such premises, there has been developed a box of the type first mentioned above, characterized in that it is formed by an integral support base member, a cable transfer member and a lid member, said support base member comprising: (i) a substantially rectangular plate member, applicable to the surface and defining a first edge for fitting to the second raceway; (ii) two prismatic tubular body members extending perpendicularly from the plate member and respectively adjacent apexes of the plate member other than those of the first edge, the tubular body members having respective upper ends; (iii) adjustable means adapted to engage the first raceway; and (iv) first means for attachment to the lid member; the cable transfer member comprising a structure holding removable sheet members and having a rear wall and a front wall; and being superimposable over a length of the first raceway; and the lid member: (i) being a hollow body having side walls and an upper cover and adapted to house the support base member and the cable transfer member; and (ii) comprising second means for attachment to the support base member.

BRIEF DESCRIPTION OF THE DRAWING

Further advantages and features of the invention will be appreciated from the following description in which, without any limitation being intended, there is disclosed a preferred embodiment of the invention, with reference to the accompanying drawings, in which:

FIG. 1 a schematic elevation view of a box for coupling of raceways for electrical conductors, functionally installed with respect to two such raceways.

FIG. 2 is a schematic plan view of the box arrangement of the previous figure.

FIG. 3 is a partly exploded perspective view of a box positioned functionally beside two raceways to be coupled.

DETAILED DESCRIPTION

Figure 5:
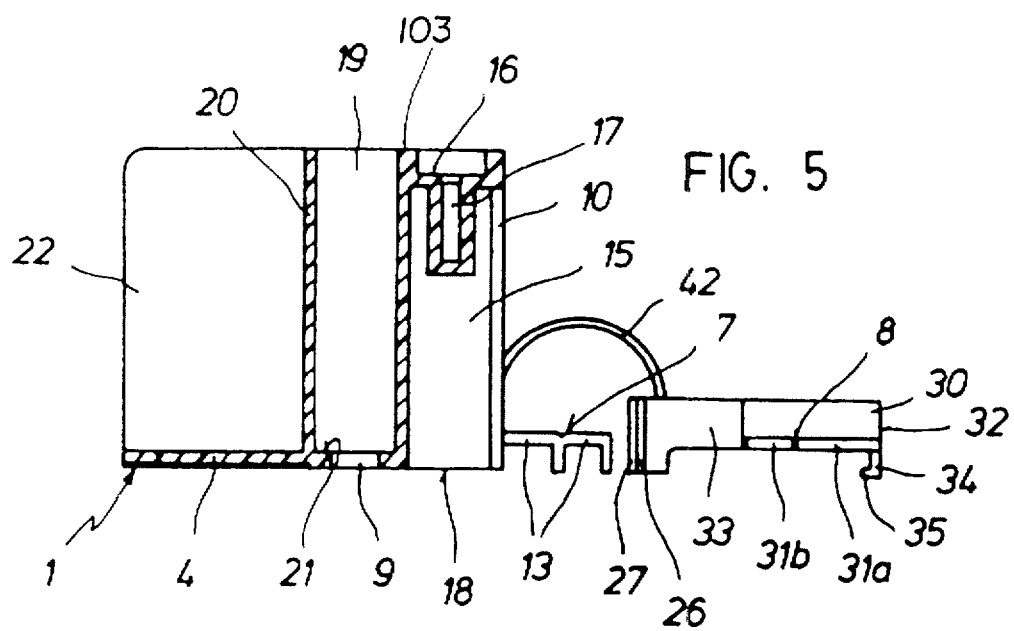
FIG. 5 is a cross section view on the line V—V of FIG. 4.

FIGS. 1, 2 and 3 show the ensemble of the coupling box for electrical lines of the invention, formed essentially by the association of an integral support base member 1, a cable transfer member 2 and a lid member 3.

The connection between the conductors A, of a first raceway 12, and B, of a second raceway 12', is effected by a conventional connector member C, such as a terminal block and in such a way that the conductor A passes through the cable transfer member 2 through an opening formed therein, passing over the corresponding wall of the "U" shaped section of the base 12a of the first raceway 12, with the connection proper being inside the junction box, as shown in FIGS. 1, 2, 6 and 7.

Figure 4:
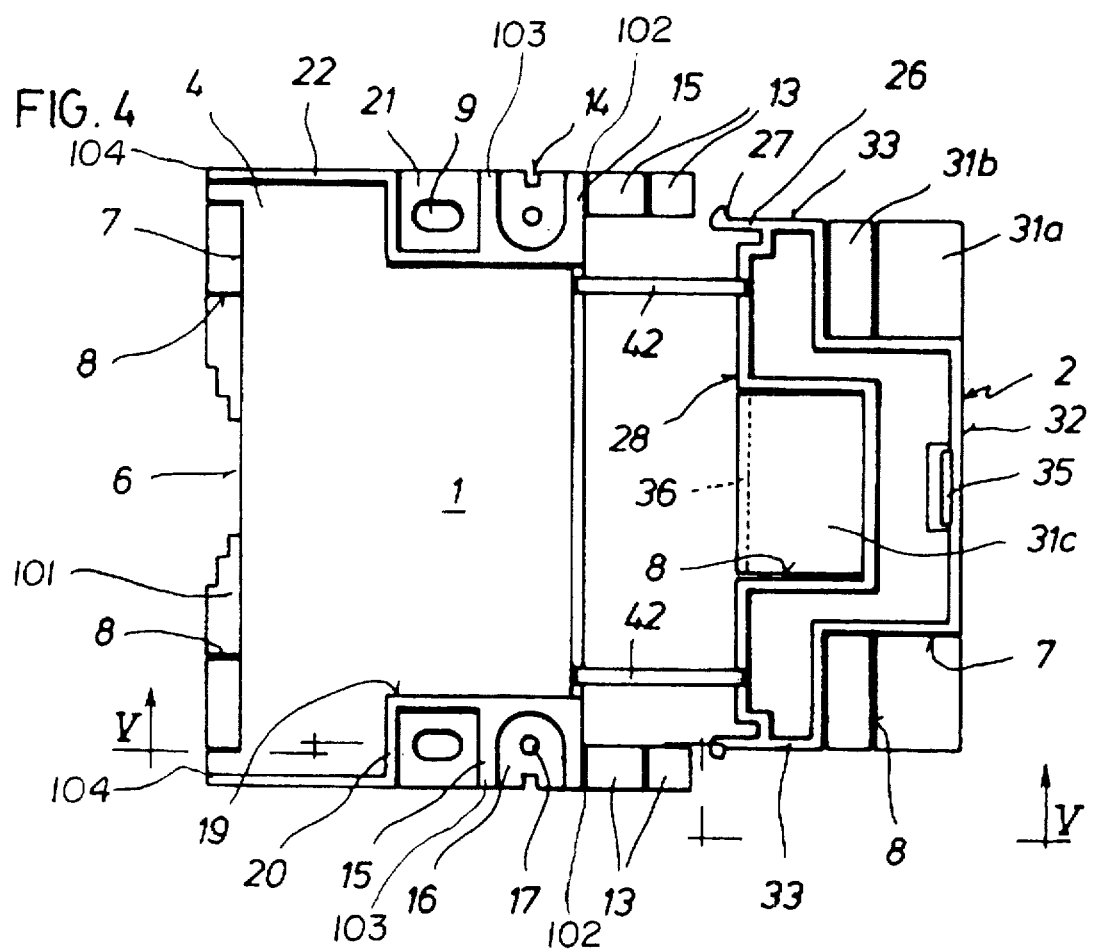
FIG. 4 is an upper plan view of the ensemble of support base member and cable transfer member as resulting from a simultaneous moulding operation, there being attached to each other by flexible ties, while being mutually disconnected.

The support base member 1, in FIGS. 3, 4 and 5, comprises a generally rectangular plate member 4, as application surface to the substrate surface 5 (FIGS. 1 and 6), having: a first edge 101 in which there is a stepped gap 6 (FIGS. 4 and 7), such that the portions of the plate member 4 flanking the gap 6 are provided with weakening and cutting lines 7 and 8 allowing for the removal of portions of the plate member for fitting to a second raceway 12'; means allowing attachment thereof to the substrate surface 5, formed by elongated holes 9 through which a screw or the like may be passed; guide means for slidingly retaining the cable transfer member 2 which, being vertically disposed relative to the rectangular plate member 4 and formed by narrow longitudinal apertures 10 (FIG. 8), or shaped longitudinal ribs 11 (FIG. 9), or simple sliding abutting planes; adjustable means for positioning adjacent a first raceway 12 formed by a base section 12a and a lid section 12b, consisting of respective series of bent appendixes 13, separated by weakening lines 7; and means for coupling the lid member 3, formed by longitudinal guide slots 14.

A preferred embodiment of the support base member 1, as shown in FIGS. 3 to 7, is formed by a moulded plastic part formed by a rectangular plate member 4, as application surface to the assembly substrate surface 5 of the raceways 12, 12'; from the plate member 4 there extend perpendicularly, in two apexes 102 other than those of the first edge, two prismatic tubular body members 15, provided: with the narrow longitudinal slots 10 formed in their respective coplanar surfaces; two longitudinal guide slots 14 in their respective outwardly facing surfaces; and mortises 16 in the upper surfaces 103 thereof. In these mortises 16 there are respective threaded holes 17 (FIGS. 4 and 5), while the lower ends 18 of the bodies 15 are open. Adjacent the bodies 15 there are two partitions 19 and 20 forming prismatic mortises open on oppositely facing sides and also at the top, while they are closed at the bottom 21, where they have an elongate hole 9; adjacent the mortises there are respective rectangular walls 22 extending to corners adjacent 104.

Figure 7:
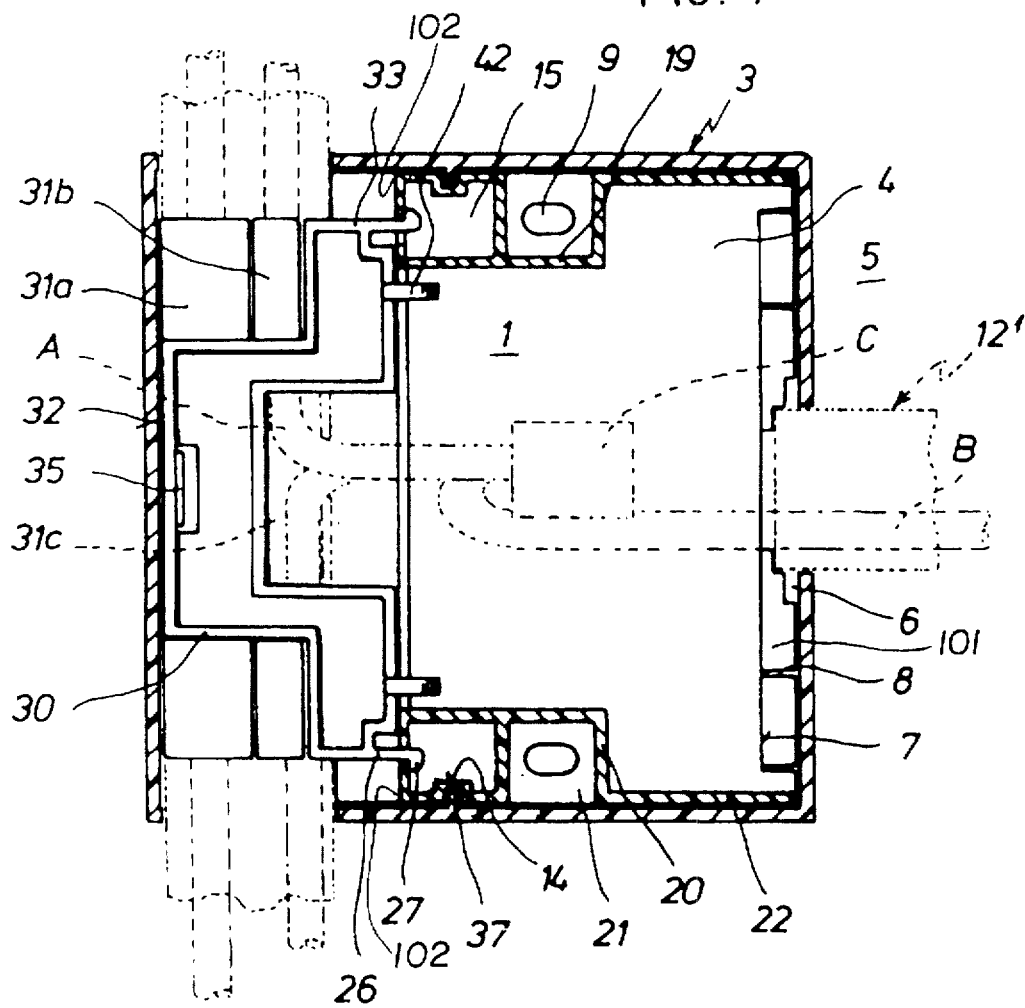
FIG. 7 is a cross section view of the said ensemble of FIG. 3, on the line VII—VII thereof.
Figure 8:
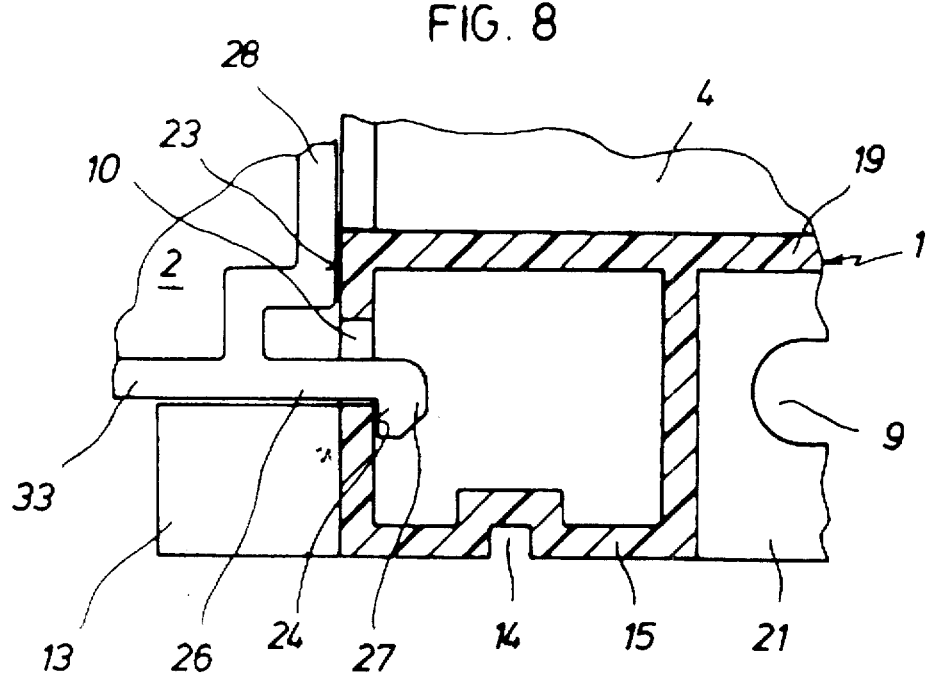
FIG. 8 is a cross section view of a detail of the coupling between the cable transfer member and the support base member, through longitudinal apertures.
Figure 9:
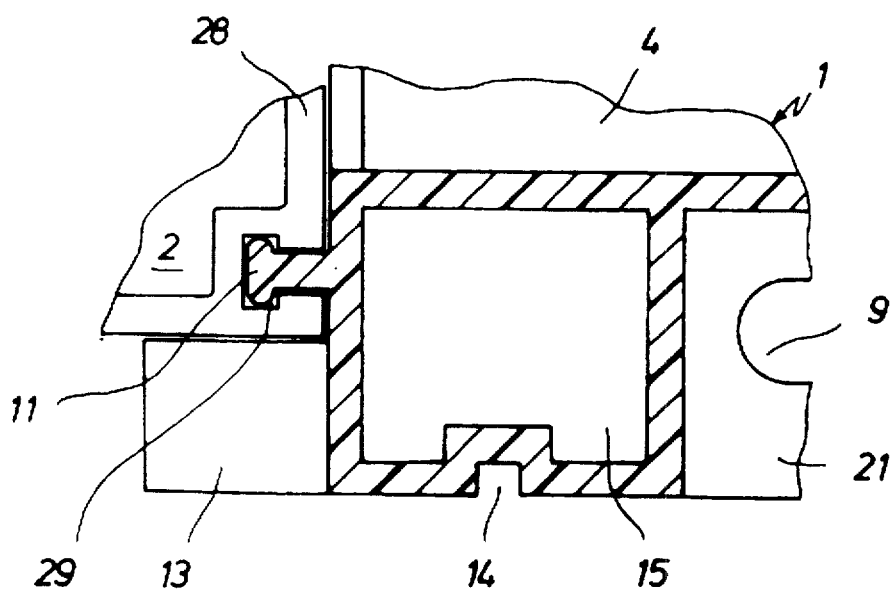
FIG. 9 is a cross section view of a detail of the coupling of the cable transfer member to the support base member by means of shaped ribs.

As stated above, the narrow longitudinal apertures 10, as shown in FIGS. 3, 5, 7 and 8, are open to the inside of the prismatic tubular body members 15 and each of them is adjacent one outer sliding surface 23 and a flat inner retaining surface 24 (FIG. 8) for the cable transfer member 2. Where the narrow longitudinal apertures 10 are replaced by shaped ribs 11, as shown in FIG. 9, the latter will fulfil the same sliding and retaining functions as entrusted to the flat surfaces 23 and 24. Both the narrow longitudinal apertures 10 and the shaped ribs 11 may have stop members limiting the sliding of the cable transfer member 2, such as is the upper bridge 25 in the apertures 10.

The cable transfer member, as shown in FIGS. 3 to 8, is provided with means for coupling, in a sliding fashion, with the prismatic tubular body members 15 and these means extend, in one case, along the narrow longitudinal slots 10 and engage the surfaces 23 and 24. The coupling means of the cable transfer member 2, in this case, are formed by a tab 26, terminated in a bent shoulder 27, which extends from a rear wall 28 of the cable transfer member 2, so dimensioned that the shoulder 27 is engaged with the flat inner surface retaining surface 24 of the corresponding prismatic tubular body member. The tab 26 has a length equivalent to the depth of the narrow longitudinal aperture 10 and the rear wall 28 abut the outer flat surface 23 of the tubular body member 15. Where, as shown in FIG. 9, the guide means contemplated in the prismatic tubular body members 15 are shaped ribs 11, the rear wall 28 of the cable transfer member 2 includes recesses 29 of a shape complementary to that of the straight section of said shaped ribs 11. The cable transfer member 2 may also be devoid of tabs or 26 or recesses 29, in which case it engages the support base member 1 by simple abutment.

The cable transfer member 2 comprises a structure 30 supporting an arrangement of sheetlike members 31 coplanar with one of the two larger sides of the robust structure 30 and removable at will therefrom to select the section of passage for the cables.

According to one preferred embodiment of the cable transfer member 2, it is formed by an integral body of low height, comprising a structure 30 of closed plan and formed like an omega-shaped wall or fence and which is complemented by the external sheetlike members 31a and 31b and by the internal sheetlike member 31c, forming a rectangular plan. Further to the rear wall 28, the robust structure 30 comprises a front wall 32 and two end walls 33, from which the coupling means project, as an extension, such as the tab 26 terminated with the bent shoulder 27 or, as a formation, configures the recesses 29 (FIG. 9).

The structure 30 of the cable transfer member 2 is provided on the front wall 32 thereof with an appendix 34 terminated with a shoulder 35 extending at rightangles towards the rear wall 28 and which may be inserted (FIG. 6) in the slot of the base section 12a of the first raceway 12, so as to retain the cable transfer member 2 to the raceway 12.

The external sheetlike members 31 are provided with weakening and cutting lines 7 and 8, relative to the structure 30 and only cutting lines 8, relative to the adjacent external sheetlike members 31.

The internal sheetlike member 31c is provided at the free edge thereof with an elongate flap 36 (FIG. 4) perpendicular to the member 31c.

The lid member 3 is formed by a preferably prismatic hollow body (FIG. 3) open at the bottom and having two straight ribs 37 on the inner sides of the two short walls 38 and which are adapted to be inserted in the longitudinal guide slots 14. It is also provided with two holes 39 in the upper surface 40, corresponding with the bases 16 of the prismatic tubular body members of the support base member 1. It is also provided with weakening lines (not shown) on the inside of median wall 41 and of the two shorter walls 38, facing each other in the latter case, defining precut lines depending on the section of the raceways 12, 12'.

According to a preferred embodiment, the support base member 1 and the cable transfer member 2 may be formed in the same moulding operation with a single mould, in which case they are attached together by resilient ties 42 or continuity bridges of the plastics material.

Figure 6:
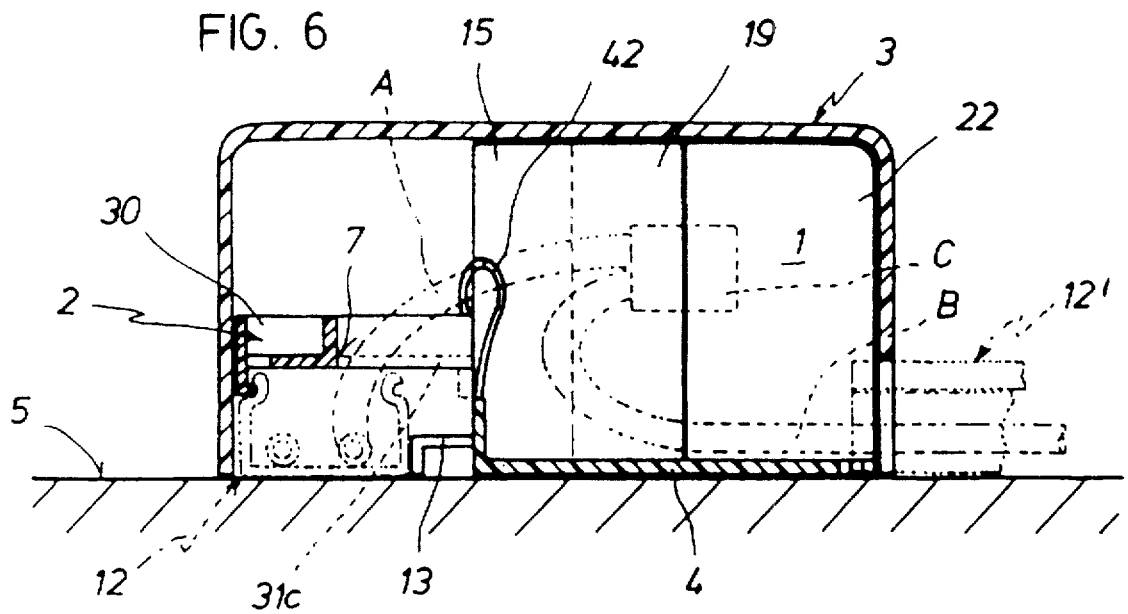
FIG. 6 is a cross section view of the ensemble formed by the association of the members of FIG. 3, on the line VI—VI of FIG. 3.

The box as described is used as follows: after disposing the support base member 1 associated with the cable transfer member 2 through the ties 42, as shown in FIGS. 4 and 5, the cable transfer member 2 is coupled to the support base member 1 by inserting the coupling means of the member 2, formed by the tab 26 and shoulder 27, in the guide means of the base 1, formed by the narrow longitudinal openings 10. Thereafter, depending on the width of the first raceway 12, the adjustable side positioning means of the support base member 1 are adjusted with regard to the raceway 12, by removing, if necessary, one or more of the bent appendices 13 to juxtapose it relative to the raceway 12, as shown in FIGS. 6 and 7. Thereafter, the height of the cable transfer member 2 is adjusted, until it slidingly fits on the base section 12a of the raceway 12, from which the lid section 12b has been removed. In this situation, the one or more sheetlike members 31 to be removed are selected, such as the one marked 31c, in FIGS. 6 and 7, so as to pass through the thus obtained orifice the conductor A to be connected to the conductor B by means of the connector C. The conductor B is housed in a second raceway 12' which is fitted in the gap 6 of the rectangular plate member 4.

Once the connection has been made and the second raceway 12' has been attached to the substrate surface 5, the pertinent openings are formed in the walls 38 and 41 of the lid member 3, so as to allow for the passage to the interior thereof of the raceways 12, 12', after which the lid member 3 is attached to the support base member 1 by sliding the straight ribs 37 of the member 3 in the guide slots 14 of the support base member 1, whereby the lid member 3 hides the end edges of the lid sections 12b affected by the junction box.

Obviously, by means of this junction box, the integrity of the walls of the base section 12a of the raceways 12, 12' affected by the box is maintained, the edges of the lid sections 12b corresponding to the former are hidden, the portion of substrate surface 5 uninsulated between the raceways 12, 12' and the support base member 1 is reduced or eliminated, at the same time as the conductors A are separated from the surface, and there is achieved a great versatility of assembly of the junction boxes which, with a limited range thereof, are applicable to a wide range of raceways 12, 12', all with a minimum number of low cost, easy to use and assemble members.

What I claim is:

1. A junction box for raceways for electrical conductors, formed by a first raceway and a second raceway, each of which is formed by a "U" shaped base section, adapted to be closed by a lid section, said raceways being applicable to a substrate surface, the box being formed by an integral support base member, a cable transfer member and a lid member, said support base member comprising:

(i) a substantially rectangular plate member, applicable to said substrate surface and defining a first edge for fitting to said second raceway;

(ii) two prismatic tubular body members extending perpendicularly from said plate member and respectively adjacent apexes of the plate member other than those of said first edge, said tubular body members having respective upper surfaces;

(iii) adjustable means for engaging said first raceway; and (iv) first means for attaching to said lid member;

wherein said cable transfer member comprises a structure holding removable sheet members and having a rear wall and a front wall, and being superimposable over a length of said first raceway; and wherein said lid member: (i) is a hollow body having side walls and an upper cover and adapted to house said support base member and said cable transfer member; and (ii) includes second means for attaching to said support base member.

2. The junction box of claim 1, wherein said support base member has first guide means for retaining said cable transfer member and said cable transfer member has second guide means for being retained in said support base member, said second guide means being complementary to said first guide means.

3. The junction box of claim 2, wherein said first guide means is two longitudinal apertures, each of which is formed in one of said tubular body members, and said second guide means is two tabs extending from said rear wall of said cable transfer member, said tabs being bent to form respective shoulders and being insertable in said two longitudinal apertures.

4. The junction box of claim 2, wherein said first guide means is two shaped ribs, each of which extends from one of said tubular body members; and said second guide means is two recesses open in said rear wall of said cable transfer member, said ribs being insertable in said recesses.

5. The junction box of claim 1, wherein said first edge of said plate member is provided with a stepped gap, and portions of said plate member flanking said stepped gap are provided with weakening and cutting lines.

6. The junction box of claim 1, wherein said adjustable means for engaging said first raceway consists of two series of bent appendices separated by weakening lines between each pair of adjacent appendices.

7. The junction box of claim 1, wherein said first means for attaching to said lid member comprises:

a longitudinal guide slot formed in each of said prismatic tubular body members, and a threaded orifice in each of said upper surfaces; and wherein said second means of said lid member for attaching to said support base member comprises two ribs insertable in said longitudinal slots and two orifices which may be superimposed on said threaded orifices.

8. The junction box of claim 1, wherein said plate member is provided with walls extending perpendicularly from edges of the plate member adjacent said first edge and each of said walls extends towards said tubular body members, forming a pair of right angled partitions; and wherein the plate member, at each portion defined between each tubular body and each pair of right angled partitions is provided with an elongated hole through which a fastening device may pass, for attaching the plate member to the substrate surface.

9. The junction box of claim 1, wherein said structure has the form of an omega-shaped wall comprising said rear wall and said omega-shaped wall, which has an appendix terminated in a shoulder extending at right angles towards the rear wall said shoulder being insertable in a base section of said first raceway.

10. The junction box of claim 1, wherein said support base member and said cable transfer member are united by flexible ties.

11. The junction box of claim 1, wherein said lid member is generally of prismatic shape.

* * * * *